United States Patent
Delaney et al.

(10) Patent No.: US 11,287,221 B2
(45) Date of Patent: Mar. 29, 2022

(54) NESTED GIMBAL ASSEMBLY

(71) Applicant: FLIR Surveillance, Inc., Wilsonville, OR (US)

(72) Inventors: Sean L. Delaney, Chelmsford, MA (US); John Nolan, Haverhill, MA (US); Mark Stinnett, Lawrence, MA (US)

(73) Assignee: FLIR SURVEILLANCE, INC., Wilsonville, OR (US)

( * ) Notice: Subject to any disclaimer, the term of this patent is extended or adjusted under 35 U.S.C. 154(b) by 0 days.

(21) Appl. No.: 17/023,252

(22) Filed: Sep. 16, 2020

(65) Prior Publication Data

US 2021/0080227 A1   Mar. 18, 2021

Related U.S. Application Data

(60) Provisional application No. 62/601,696, filed on Sep. 17, 2019.

(51) Int. Cl.
*F41G 3/22* (2006.01)
*F16M 11/12* (2006.01)
*F41A 27/14* (2006.01)

(52) U.S. Cl.
CPC ............ *F41G 3/22* (2013.01); *F16M 11/123* (2013.01); *F41A 27/14* (2013.01)

(58) Field of Classification Search
CPC ......... F41G 3/22; F41A 27/14; F16M 11/123; F16M 11/08; F16M 11/12; F16M 11/121; F16M 11/125; F16M 11/126; F16M 11/128; G03B 17/561
USPC ..................................................... 248/177.1
See application file for complete search history.

(56) References Cited

U.S. PATENT DOCUMENTS

| | | | |
|---|---|---|---|
| 4,217,606 A * | 8/1980 | Nordmann | F16M 11/18 348/151 |
| 5,600,511 A * | 2/1997 | Dunfield | G11B 25/043 360/98.07 |
| 9,372,340 B2 | 6/2016 | Williams | |
| 9,435,520 B2 | 9/2016 | Segerstrom et al. | |
| 9,442,185 B2 | 9/2016 | Williams | |
| 10,612,664 B2 * | 4/2020 | Weaver | F16M 11/06 |
| 2014/0133152 A1 * | 5/2014 | Buehler | F41G 3/145 362/259 |
| 2014/0367537 A1 * | 12/2014 | Rudier | F16M 11/08 248/183.2 |

(Continued)

FOREIGN PATENT DOCUMENTS

EP         0559402       9/1993
WO    WO 1983001681     5/1983

*Primary Examiner* — Christopher Garft
(74) *Attorney, Agent, or Firm* — Haynes and Boone, LLP

(57) ABSTRACT

Techniques are disclosed for systems and methods for nested gimbal assemblies. A gimbal system may include a base, a yoke, and a gimbal assembly rotatably connecting the yoke to the base. The gimbal assembly may include a motor, a bearing, and a ferrofluid seal. The motor may be configured to rotate the yoke relative to the base about a rotational axis. The bearing may be seated within the base and permit rotation of the yoke relative to the base about the rotational axis. The ferrofluid seal may be positioned to seal an interface between the yoke and the base. The motor may be positioned within an inner diameter of the bearing. The bearing may be positioned within an inner diameter of the ferrofluid seal.

20 Claims, 3 Drawing Sheets

(56) References Cited

U.S. PATENT DOCUMENTS

2018/0094729 A1* 4/2018 Weaver ................. F16M 11/08

* cited by examiner

NESTED GIMBAL ASSEMBLY

CROSS REFERENCE TO RELATED APPLICATIONS

This application claims the benefit of and priority to U.S. Provisional Patent Application No. 62/901,696 filed Sep. 17, 2019 and entitled "NESTED GIMBAL ASSEMBLY," which is incorporated herein by reference in its entirety.

TECHNICAL FIELD

One or more embodiments of the invention relate generally to gimbal systems and more particularly, for example, to one or more gimbal systems with a nested gimbal assembly.

BACKGROUND

A gimbal system may incorporate an orientation-dependent device payload, such as an optical detector, imaging device, or the like. The gimbal system may have at least two gimbals or gimbal assemblies that offer the payload two degrees of rotational freedom via rotary joints. With this rotational freedom, the payload may be panned and tilted to survey a wide field of view or aim at a specific target.

Each gimbal or gimbal assembly may be secured to a housing or base component using various seals and bearings. Additional components may be housed within the housing or base component, including one or more electronic control units (ECUs), printed circuit boards (PCBs), sensors, and associated wiring. As gimbal systems become more complex (requiring increasing amounts of ECUs, PCBs, sensors, and/or wiring) and/or smaller in size, there is a need in the art to reduce the space required to secure the gimbal or gimbal assembly to the housing or base component.

SUMMARY

Techniques are disclosed for systems and methods for securing components of a gimbal assembly within or to a housing or base component in a nested arrangement. In one embodiment, a gimbal system includes a base, a yoke, and a gimbal assembly rotatably connecting the yoke to the base. The gimbal assembly may include a motor configured to rotate the yoke relative to the base about a rotational axis, a bearing seated within the base and permitting rotation of the yoke relative to the base about the rotational axis, and a ferrofluid seal positioned between the yoke and the base. The motor may define a motor outer diameter. The bearing may define a bearing inner diameter and a bearing outer diameter. The ferrofluid seal may define a seal inner diameter. The motor outer diameter may be less than the bearing inner diameter. The bearing outer diameter may be less than the seal inner diameter.

In another embodiment, a gimbal system includes a base, a yoke, and a gimbal assembly rotatably connecting the yoke to the base. The gimbal assembly may include a stem assembly connected to the yoke, a motor configured to rotate the stem assembly relative to the base about a rotational axis, a bearing seated onto the stem assembly and within the base to permit rotation of the yoke relative to the base about the rotational axis, a ferrofluid seal fluidically sealing an interface between the stem assembly and the base, and a labyrinth seal fluidically sealing an interface between the yoke and the base. The motor may be positioned within an inner diameter of the bearing. The bearing may be positioned within an inner diameter of the ferrofluid seal.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
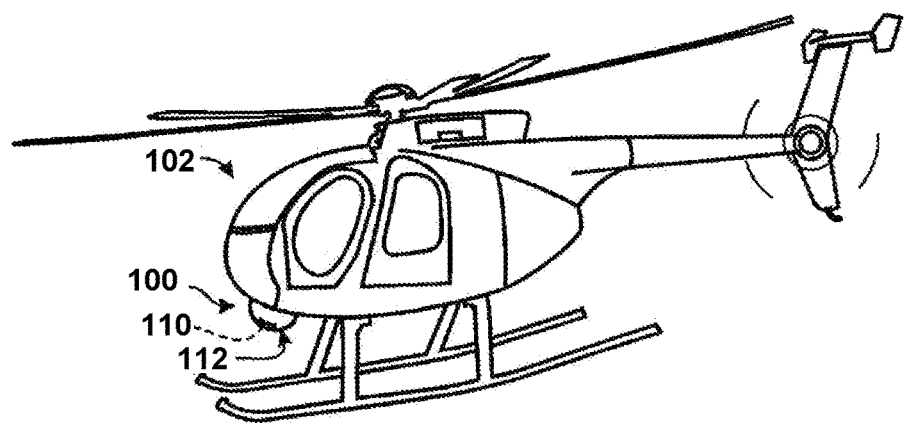
FIG. 1 is a perspective view of an exemplary gimbal system mounted to an exemplary support platform in accordance with an embodiment of the disclosure.

FIG. 1 is a perspective view of an exemplary gimbal system 100 mounted to an exemplary support platform 102. As described herein, support platform 102 refers to any mechanism for supporting and/or conveying gimbal system 100, whether movable or fixed in position. Though FIG. 1 illustrates support platform 102 as a helicopter, FIG. 1 is illustrative only and the support platform 102 may be any type of structure or vehicle, whether stationary or movable. For instance, the support platform 102 may be a building, wall, deck, surface, vehicle, watercraft, aircraft, or the like. Exemplary vehicles include a car, truck, motorcycle, bicycle, scooter, or any other ground vehicle providing transportation of persons or objects on land. Exemplary watercrafts include a boat, submarine, ship, or any other water vehicle providing transportation of persons or objects on water. Exemplary aircrafts include piloted aircrafts, pilotless remote-controlled aircrafts, drones, gliders, helicopters, balloons, missiles, rockets, or any other air vehicle providing transportation of persons or objects in air. In this manner, the gimbal system 100 may be used for any suitable application, including navigation, targeting, search and rescue, law enforcement, firefighting, force protection, surveillance, photography, and/or filming, among others.

As shown in FIG. 1, the gimbal system 100 may contain a payload 110 that is aimed azimuthally (panned) and elevationally (tilted), among others, by one or more gimbal assemblies 112. The angular orientation of the payload 110 may be adjusted horizontally and vertically, among others, via the one or more gimbal assemblies 112. For example, the one or more gimbal assemblies 112 may adjust the angular orientation of the payload 110 to maintain line of sight of the payload 110 to a target or target area as the orientation and/or position of the support platform 102 changes relative to the target. Such examples include situations where the support platform 102 travels over land, in or on water, or through the air relative to the target, where the target move relative to a fixed support platform 102, or the like, as explained in further detail below. The one or more gimbal assemblies 112 may also readjust the payload 110 to acquire a different target or target area.

As described herein, the payload 110 is any device or collection of devices that is carried and aimed by the gimbal system 100. As one example, the payload 110 may include one or more detectors and/or emitters, among others. A detector may create a signal representative of detected energy and/or force, such as electromagnetic radiation, an electric field, a magnetic field, a pressure or pressure difference (e.g., sonic energy), a temperature or temperature difference (e.g., thermal energy), a particle or particles (e.g., high energy particles), movement (e.g., an inertial measurement device), and/or the like. An emitter generally comprises any mechanism for emitting a suitable or desired signal, such as electromagnetic radiation (e.g., via a laser), sonic energy, and/or the like. In some examples, the payload 110 may contain high heat-emitting components, such as lasers, radars, millimeter-wave (MMW) imagers, light detection and ranging (LIDAR) imagers, mine-detection sensors, and/or inertial measurement units (IMUs).

In one or more embodiments, the payload 110 may form at least a detection portion of an imaging system. An imaging system generally comprises any device or assembly of devices configured to generate an image, or an image signal, based on received energy, such as electromagnetic radiation. Generally, an imaging system detects spatially distributed imaging energy (e.g., visible light and/or infrared radiation, among others) and converts it to a representative signal. Imaging may involve optically forming a duplicate, counterpart, and/or other representative reproduction of an object or scene, especially using a mirror and/or lens. Detecting may involve recording such a duplicate, counterpart, and/or other representative reproduction, in analog or digital formats, especially using film and/or digital recording mechanisms. Accordingly, an imaging system may include an analog camera that receives radiation (e.g., optical radiation) and exposes film based on the received radiation, thus producing an image on the film. Alternatively, or in addition, an imaging system may include a digital camera that receives radiation (e.g., optical radiation) and generates a digital image signal that includes information that can be used to generate an image that visually portrays the received radiation. Alternatively, or in addition, an imaging system may include an active component such as a laser to illuminate a scene and form an image from one or more reflections of the laser. "Imaging energy," as used herein, may include any type of energy, particularly electromagnetic energy, from which an image can be generated, including but not limited to optical radiation (ultraviolet radiation, visible light, and/or infrared radiation).

Suitable detectors for an imaging system may include (1) array detectors, such as charge-coupled devices (CCDs), charge-injection devices (CIDs), complementary metal-oxide semiconductor (CMOS) arrays, photodiode arrays, microbolometers, and the like, and/or (2) arrays of point detectors, such as photomultiplier tubes (PMTs), photodiodes, pin photodiodes, avalanche photodiodes, photocells, phototubes, and the like. Detectors may be sensitive to the intensity, wavelength, polarization, and/or coherence of the detected imaging energy, among other properties, as well as spatial and/or temporal variations thereof.

The imaging system also may include optics (i.e., one or more optical elements). Exemplary optical elements may include (1) reflective elements (such as mirrors), (2) refractive elements (such as lenses), (3) transmissive or conductive elements (such as fiber optics or light guides), (4) diffractive elements (such as gratings), and/or (5) subtractive elements (such as filters), among others. Such imaging systems are non-limiting, and the imaging system may be any type of device or assembly configured to generate an image or image signal based on received energy.

The payload 110 alternatively, or in addition, may include non-imaging systems, such as laser rangefinders, laser designators, laser communication devices, polarimeters, hyperspectral sensors, and/or the like. In some embodiments, the payload 110 may include a plurality of optical devices, such as an infrared camera, a video camera for visible light (e.g., a closed-circuit television camera), a laser rangefinder, a light source that serves as a pointer and/or illuminator, or any combination thereof. Such non-imaging systems are non-limiting, and the payload 110 may be any type of non-imaging device or assembly.

Figure 2:
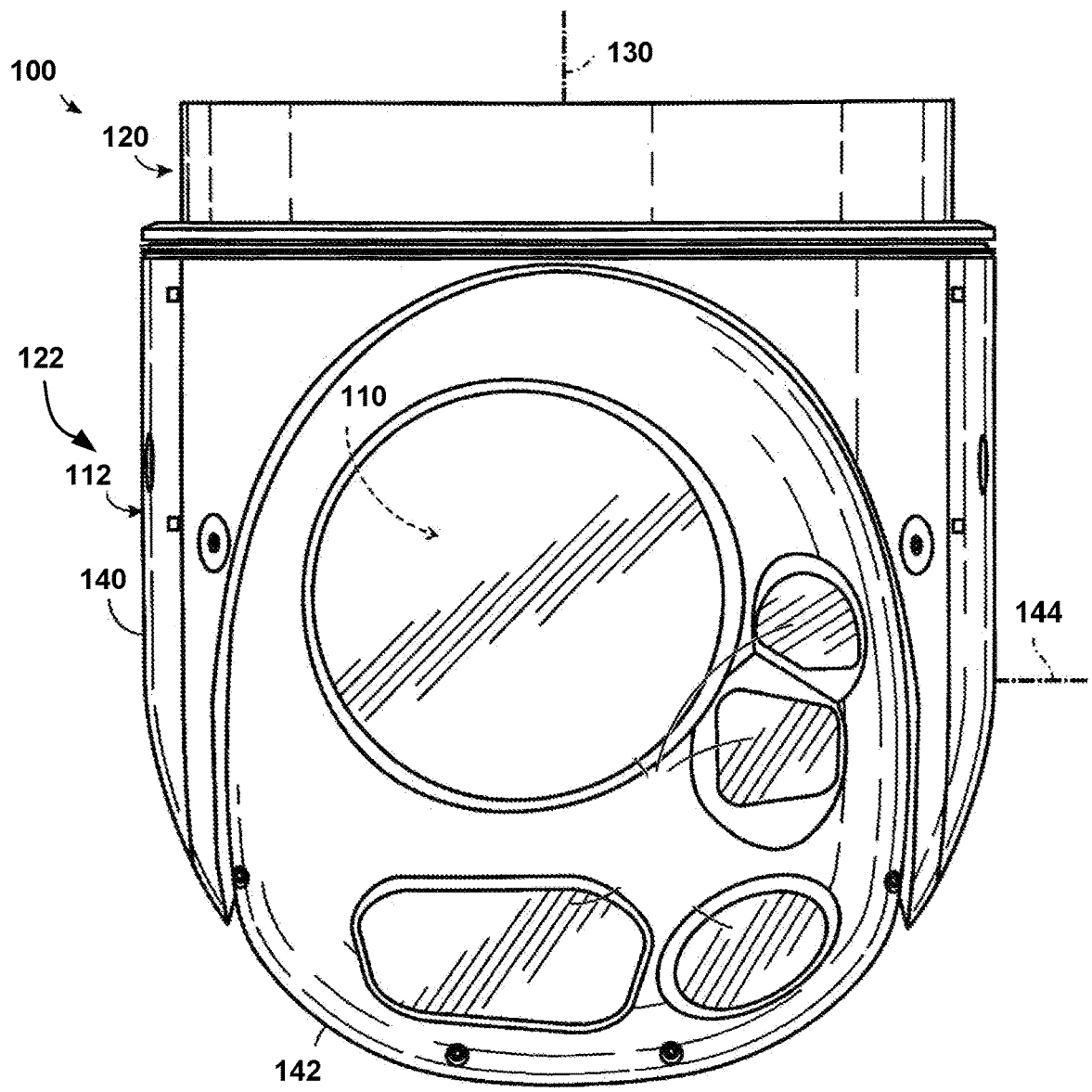
FIG. 2 is an elevation view of an exemplary gimbal system unattached to a support platform in accordance with an embodiment of the disclosure.

FIG. 2 is an elevation view of the gimbal system 100 unattached to support platform 102. Referring to FIG. 2, the gimbal system 100 may include a base 120 (interchangeably called a fixed portion or a mounting portion) and a yoke 122 (interchangeably called a pivotable portion or a rotatable portion). In one or more embodiments, the yoke 122 may be rotatably connected to the base 120 for rotation about a first rotational axis 130, such as via the gimbal assembly 112. The base 120 may support yoke 122 and provide one or more attachment sites for connecting the gimbal system 100 to the support platform 102 (e.g., via fasteners, corresponding retention features, or the like). As shown, the payload 110 may be attached to the yoke 122. The yoke 122 may rotate relative to the base 120 about the first rotational axis 130 through any angular range, such as 360 degrees, less than 360 degrees, or at least about (or no more than) 180, 90, 45, 30, 20, or 10 degrees, among others.

In one or more embodiments, the gimbal system 100 may include a series of two or more gimbal assemblies 112 (interchangeably called a gimbal), with each gimbal being supported by a preceding gimbal of the series and/or supporting a succeeding gimbal of the series. For example, the gimbal system 100 may include a first, azimuthal gimbal 140 supported by the base 120 and rotatable about the first rotational axis 130. The gimbal system 100 may include second, elevational gimbal 142 supported by the first gimbal 140 and rotatable about a second rotational axis 144. The second rotational axis 144 may be orthogonal to the first rotational axis 130. As shown, the payload 110 may be attached to the second gimbal 142, though other configurations are contemplated, as detailed below.

Figure 3:
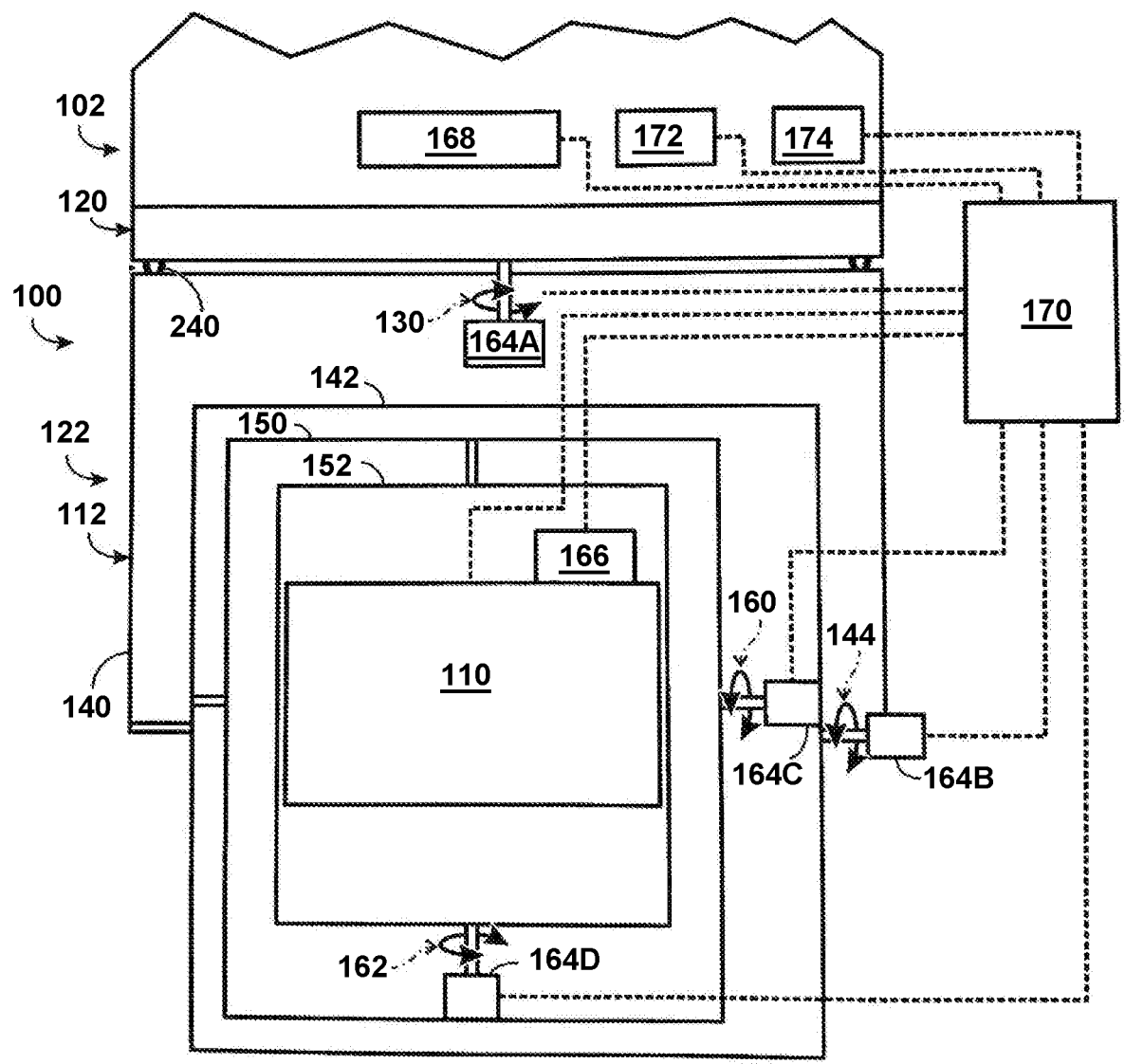
FIG. 3 is a schematic view of an exemplary gimbal system in accordance with an embodiment of the disclosure.

FIG. 3 is a schematic view of the gimbal system 100 according to one or more embodiments. Referring to FIG. 3, the yoke 122 may be pivotably connected to and supported by the base 120 (e.g., with the yoke 122 located below or above the base 120, among others) and rotatable with respect to the base 120 (and support platform 102). Payload 110 may be orientable with respect to the yoke 122 and/or base 120 (and support platform 102) by rotation of one or more gimbals (e.g., gimbal assembly 112) about a plurality of axes, such as at least two nonparallel axes, such as a pair of transverse axes (e.g., the first rotational axis 130 and the second rotational axis 144).

Depending on the application, the gimbal assembly 112 may include a series of two or more gimbals, such as first through fourth gimbals 140, 142, 150, 152. The two or more gimbals may be nested in supporting the payload 110. Each gimbal may be a support that is rotatably connected to a preceding and/or a succeeding gimbal of the series. For example, the first gimbal 140 may support the second through fourth gimbals 142, 150, 152, with the first gimbal 140 supported by the base 120 for rotation about a first yaw, azimuthal, and/or vertical axis (e.g., the first rotational axis 130), which may extend centrally through base 120 and/or gimbal system 100. The second gimbal 142 may support the third and fourth gimbals 150, 152, with the second gimbal 142 rotatably connected to and supported by the first gimbal 140 for rotation about a first pitch, elevational, and/or horizontal axis (e.g., the second rotational axis 144), which may be orthogonal to the first rotational axis 130. The third gimbal 150 may support the fourth gimbal 152, with the third gimbal 150 rotatably connected to and supported by the second gimbal 142 for rotation about a second pitch, elevational, and/or horizontal axis (e.g., a third rotational axis 160). The fourth gimbal 152 may support the payload 110, with the fourth gimbal 152 rotatably connected to and supported by the third gimbal 150 for rotation about a second yaw, azimuthal, and/or vertical axis (e.g., a fourth rotational axis 162). The above examples are illustrative only, and in one or more embodiments, the third and fourth gimbals 150, 152 may be omitted.

Rotation of each gimbal may be driven by a respective motor 164A, 164B, 164C, 164D. Each motor may be attached to its corresponding gimbal or to the structure that supports the gimbal, or a combination thereof. For example, a first motor 164A may be attached to the base 120 and/or first gimbal 140 for driving rotation of the first gimbal 140 about the first rotational axis 130, a second motor 164B to the first gimbal 140 and/or second gimbal 142 for driving rotation of the second gimbal 142 about the second rotational axis 144, a third motor 164C to the second gimbal 142 and/or third gimbal 150 for driving rotation of the third gimbal 150 about the third rotational axis 160, a fourth motor 164D to the third gimbal 150 and/or the fourth gimbal 152 for driving rotation of the fourth gimbal about the fourth rotational axis 162, and so on. Accordingly, the angular orientation of the payload 110 may be adjusted horizontally and vertically, among others, via rotation of the gimbals by the various motors, without changing the orientation of support platform 102, and/or the payload 110 may continue to point at a target as the orientation of support platform 102 changes, among others. In this manner, the gimbal system 100 may allow one or more fixed and/or moving targets to be monitored or tracked over time from a fixed and/or moving support platform 102.

The gimbal system 100 may include one or more sensors to sense aspects of the support platform 102, one or more gimbals, the payload 110, or a target. Exemplary sensors include an orientation sensor (e.g., a gyroscope that measures angular position or rate of angular change, among others), an accelerometer, an optical sensor to detect optical radiation (e.g., an imaging detector), or the like. At least one gimbal of the gimbal assembly 112 and/or the payload 110 may be attached to at least one gyroscope 166 to measure the orientation of the gimbal and/or payload 110. In some cases, the gimbal system 100 may include at least one inertial measurement unit (IMU) 168, which may be carried by gimbal assembly 112 (e.g., by payload 110 or fourth gimbal), and/or support platform 102. The IMU includes sensors to measure acceleration along three orthogonal axes and angular position/change about three orthogonal axes. Measurements from IMU alone or in combination with those from one or more other gyroscopes of the gimbal assembly 112 may be used to aim the payload 110 with respect to an inertial reference frame (e.g., the earth), as the vehicle travels with respect to the reference frame.

With continued reference to FIG. 3, the gimbal system 100 may include a processor 170 and a user interface 172 to communicate user preferences, commands, etc., to the processor 170. The processor 170 may include any electronic device or set of electronic devices responsible for signal processing, manipulation of data, and/or communication between or among gimbal system 100 components. The processor 170 may be localized to one site or may be distributed to two or more spaced sites of the gimbal system 100. The processor 170 may be programmed to receive user inputs from user interface 172 and to control operation of and/or receive signals from any suitable system component, as indicated by dashed lines in FIG. 3 (e.g., motors, sensors, payload 110, a display 174, and so on). Accordingly, the processor 170 may receive signals from and/or send signals to the system components and may control and/or respond to operation of these components.

The gimbal system 100 may include and/or be connected to a power supply 180. The power supply 180 may include any mechanism for supplying power, such as electrical power, to the motors, sensors, imaging device, processor 170, etc. The power supply 180 may be contained by the support platform 102, the base 120, the gimbal assembly 112, or a combination thereof, among others. Suitable power supplies may generate, condition, and/or deliver electrical power, including AC and/or DC power, in continuous and/or pulsed modes. Exemplary power supplies may include batteries, AC-to-DC converters, DC-to-AC converters, and so on.

Figure 4:
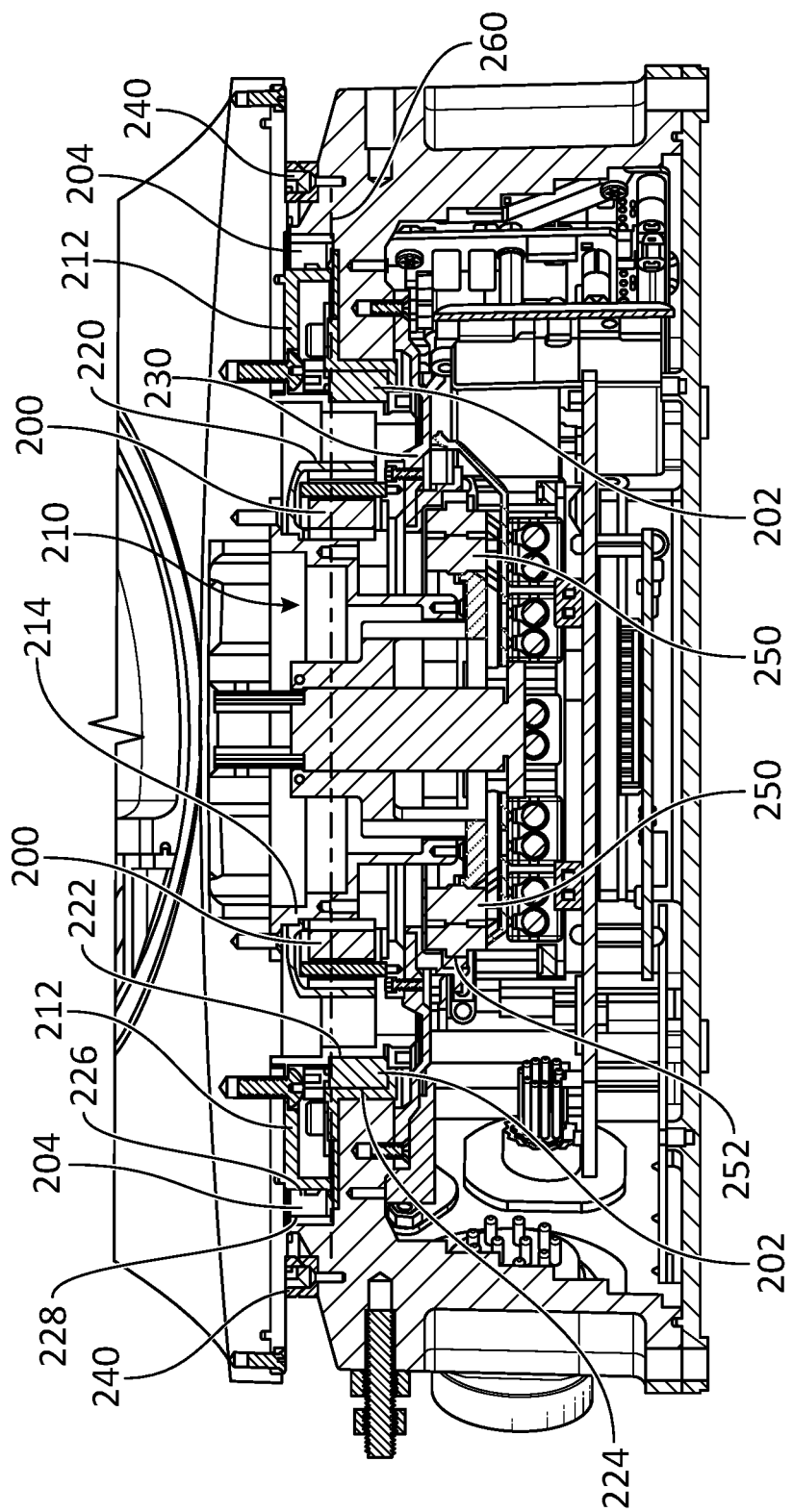
FIG. 4 is a fragmentary cross-sectional view of the gimbal system of FIG. 2 in accordance with an embodiment of the disclosure.

FIG. 4 is a fragmentary cross-sectional view of the gimbal system 100 showing gimbal assembly 112 rotatably connecting the yoke 122 to the base 120. Referring to FIG. 4, the gimbal assembly 112 includes a motor 200, a bearing 202, and a ferrofluid seal 204, each described below. The gimbal assembly 112 may also include a stem assembly 210, the stem assembly 210 configured to rotatably connect the yoke 122 to the base 120. Depending on the application, the stem assembly 210 may be a portion of the yoke 122, such as formed integrally with yoke 122, or may be a separate element connected to the yoke 122, such as via fasteners, heat or sonic welding, adhesive, or the like. In one or more embodiments, the stem assembly 210 may be defined by a plurality of elements. For example, as shown in FIG. 4, the stem assembly 210 may include a first stem 212 and a second stem 214 allowing nesting of the various components of the gimbal assembly 112, as detailed below. For instance, as described more fully below, the first stem 212 may mount the bearing 202 and the ferrofluid seal 204 within the base 120, with the second stem 214 mounting the motor 200 within the base 120 in a nested relationship.

The motor 200 may be configured to rotate the yoke 122 and/or stem assembly 210 relative to the base 120 about an axis, such as first rotational axis 130 shown in FIG. 4. For example, actuation of the motor 200 may turn, rotate, or otherwise move stem assembly 210 to move yoke 122 as desired. Depending on the application, actuation of the motor 200 may rotate the stem assembly 210 to adjust the roll, pitch, or yaw of the yoke 122. In such examples, the motor 200 may engage the stem assembly 210 (e.g., the second stem 214) to rotate the yoke 122 relative to the base 120.

The motor 200 may be any type of electric motor configured to rotate the yoke 122 about a rotational axis. For instance, the motor 200 may be any one or combination of the following motor types: AC brushless, DC brushed, DC brushless, direct drive, linear, servo, or stepper, among others. In some examples, the gimbal assembly 112 may include appropriate connecting members or assemblies (e.g., linkages, racks, gearing, etc.) mechanically linking the motor 200 to the yoke 122. For example, the motor 200 may transmit torque via a drive shaft to a first gear, which is meshed with a second gear that is attached to the yoke 122 and/or the stem assembly 210. In some examples, a portion of the yoke 122 (or an element connected to yoke 122) may form a portion of the motor 200 itself, such as at least a portion of a rotor of the motor 200. As shown in FIG. 4, the motor 200 may define a motor outer diameter 220.

The bearing 202 may be configured and arranged to permit rotation of the yoke 122 and/or stem assembly 210 relative to the base 120 about an axis, such as first rotational axis 130 shown in FIG. 4. For instance, the bearing 202 may be seated within the base 120, with the stem assembly 210 (e.g., first stem 212) seated at least partially within the bearing 202 to rotatably connect the yoke 122 to the base 120. The bearing 202 may be any type of element constraining movement of the yoke 122 and/or stem assembly 210 relative to the base 120 about a fixed axis, such as first rotational axis 130 shown in FIG. 4. In some embodiments, the bearing 202 may reduce friction and/or transfer axial and radial loads from the yoke 122 and/or stem assembly 210 to the base 120. Depending on the application, the bearing 202 may be any one or combination of the following bearing types: plain (e.g., bushing, journal, sleeve, etc.), rolling (e.g., ball or roller), jewel, fluid, or magnetic, among others. As shown in FIG. 4, the bearing 202 may define a bearing inner diameter 222 and a bearing outer diameter 224.

The ferrofluid seal 204 may be configured and arranged to fluidically seal an interface between the yoke 122 (and/or stem assembly 210) and the base 120. More particularly, the ferrofluid seal 204 may be positioned between the base 120 and either the yoke 122 or the stem assembly 210. In one or more embodiments, the ferrofluid seal 204 may be seated within the base 120 to sealingly engage the first stem 212 of the stem assembly 210. The ferrofluid seal 204 may permit rotatable motion of the stem assembly 210 relative to the base 120 while maintaining a circumferential fluid-tight seal between these elements. The ferrofluid seal 204 may be any type of magnetic liquid rotary seal. The stem assembly 210 may be configured to promote proper functioning of the ferrofluid seal 204. For instance, the portion of the stem assembly 210 in contact with the ferrofluid seal 204 (e.g., the first stem 212) may be magnetic to support the magnetic nature of the ferrofluid seal 204. As shown in FIG. 4, the ferrofluid seal 204 may define a seal inner diameter 226 and a seal outer diameter 228.

The stem assembly 210 may be configured and arranged to match the characteristics of the motor 200, bearing 202, or the like. For example, the first stem 212 may be formed of a first material, and the second stem 214 may be formed of a second material different from the first material. As noted above, the first material may be magnetic to support the ferrofluid seal 204. For example, the first material may be 416 stainless steel or any other material with magnetic properties. In such examples, the second material may be 6061-T6 aluminum. In one or more embodiments, the first and second materials may have a coefficient of thermal expansion matching those of the elements to which the first and second stems 212, 214 are connected. For instance, the first material may have a coefficient of thermal expansion matching that of the bearing 202, such as being formed of the same or similar material. The second material may have a coefficient of thermal expansion matching that of the motor 200 or at least a motor mount 230 securing the motor 200 to the base 120.

The gimbal system 100 and/or gimbal assembly 112 may include other features for convenience. For example, the gimbal assembly 112 may include a labyrinth seal 240 configured and arranged to fluidically seal an interface between the yoke 122 and the base 120. The labyrinth seal 240 may be positioned outside of the ferrofluid seal 204 to seal the gap between the yoke 122 and the base 120. The labyrinth seal 240 may permit rotary movement of the yoke 122 relative to the base 120 while maintaining a fluid-tight seal between the elements. In some embodiments, the gimbal assembly 112 may include a resolver 250, the resolver 250 resolving the torques applied to the yoke 122 and/or stem assembly 210 by the motor 200. For instance, a closed feedback loop may be formed between the resolver 250 and the motor 200 to control orientation of the yoke 122 and/or stem assembly 210 by the motor 200 relative to a closed reference point, position, or plane, among others. As shown in FIG. 4, the resolver 250 may be mounted within the base 120 by the second stem 214 of the stem assembly 210. The resolver 250 may define a resolver outer diameter 252.

As noted above, the various components of the gimbal assembly 112 may be positioned in a nesting relationship. The nesting relationship may reduce the height of the stem assembly 210 compared to traditional designs, thereby reducing the height of the base 120 and/or creating additional volume within the base 120 (e.g., space below the stem assembly 210) for additional components, such as additional ECUs, PCBs, sensors, and/or wiring. The nesting relationship may also increase the stiffness of the gimbal system 100 compared to traditional designs. For instance, the nesting relationship may increase the diameter of the bearing 202 compared to traditional designs, thereby placing the bearing 202 nearer one or more mounting locations (e.g., holes, brackets, etc.) of the base 120. In this manner, a load path from the mounting locations to the bearing 202 may be decreased to increase the stiffness of the gimbal system mounting.

The various components of the gimbal assembly 112 may be positioned and arranged to provide the nesting relationship discussed above. For instance, as shown in FIG. 4, the motor outer diameter 220 may be less than the bearing inner diameter 222, and the bearing outer diameter 224 may be less than the seal inner diameter 226. In this manner, the motor 200 may be positioned within an inner diameter of the bearing 202, and the bearing 202 may be positioned within an inner diameter of the ferrofluid seal 204. The resolver 250, ferrofluid seal 204, and/or labyrinth seal 240 may be configured similarly. For example, the resolver outer diameter 252 may be less than the bearing inner diameter 222 such that the resolver 250 may be positioned within the inner diameter of the bearing 202. The ferrofluid seal 204 may be positioned within an inner diameter of the labyrinth seal 240. The stem assembly 210 may also be arranged to provide the nesting relationship of the motor 200, bearing 202, and/or ferrofluid seal 204. For instance, at least a portion of the first stem 212 may be positioned between the bearing 202 and the motor 200. In addition, at least a portion of the first stem 212 may be positioned between the bearing 202 and the ferrofluid seal 204. At least a portion of the second stem 214 may be positioned within the inner diameter of the motor 200.

With continued reference to FIG. 4, the nesting relationship of the various components of the gimbal assembly 112 may allow two or more components of the gimbal assembly 112 to lie within the same plane. For instance, with reference to FIG. 4, a reference plane 260 may be defined orthogonal to the first rotational axis 130. As shown, the reference plane 260 intersects at least portions of the motor 200 and the bearing 202. In one or more embodiments, the reference plane 260 may intersect at least portions of the first stem 212 and the second stem 214. In some embodiments, the reference plane 260 may intersect at least portions of the motor 200, bearing 202, and ferrofluid seal 204.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A gimbal system comprising:
a base;
a yoke; and
a gimbal assembly rotatably connecting the yoke to the base, the gimbal assembly comprising:
a motor configured to rotate the yoke relative to the base about a rotational axis, the motor defining a motor outer diameter;
a bearing seated within the base and permitting rotation of the yoke relative to the base about the rotational axis, the bearing defining a bearing inner diameter and a bearing outer diameter;
a ferrofluid seal positioned between the yoke and the base, the ferrofluid seal defining a seal inner diameter; and
a labyrinth seal positioned between the yoke and the base, the labyrinth seal positioned outside of the ferrofluid seal;
wherein the motor outer diameter is less than the bearing inner diameter; and
wherein the bearing outer diameter is less than the seal inner diameter.

2. The gimbal system of claim 1, wherein the gimbal assembly further comprises a resolver to resolve torques applied to the yoke by the motor, the resolver defining a resolver outer diameter that is less than the bearing inner diameter.

3. The gimbal system of claim 1, wherein the gimbal assembly further comprises a stem assembly connected to the yoke and seated at least partially within the bearing to rotatably connect the yoke to the base, the motor engaging the stem assembly to rotate the yoke relative to the base.

4. The gimbal system of claim 3, wherein the ferrofluid seal is positioned between the stem assembly and the base.

5. The gimbal system of claim 3, wherein the stem assembly comprises a first stem and a second stem.

6. The gimbal system of claim 5, wherein:
the first stem is formed of a first material having a coefficient of thermal expansion to match that of the bearing; and
the second stem is formed of a second material having a coefficient of thermal expansion to match that of a motor mount securing the motor to the base.

7. The gimbal system of claim 5, wherein:
a reference plane is defined orthogonal to the rotational axis; and
wherein the reference plane intersects at least portions of the motor and bearing.

8. The gimbal system of claim 7, wherein the reference plane intersects at least portions of the first stem and the second stem.

9. The gimbal system of claim 8, wherein the reference plane intersects at least portions of the motor, bearing, and ferrofluid seal.

10. A gimbal system comprising:
a base;
a yoke; and
a gimbal assembly rotatably connecting the yoke to the base, the gimbal assembly comprising:
a stem assembly connected to the yoke;
a motor configured to rotate the stem assembly relative to the base about a rotational axis;
a bearing seated onto the stem assembly and within the base to permit rotation of the yoke relative to the base about the rotational axis;
a labyrinth seal fluidically sealing an interface between the yoke and the base; and
a ferrofluid seal fluidically sealing an interface between the stem assembly and the base, wherein the ferrofluid seal is positioned within the diameter of the labyrinth seal;
wherein the motor is positioned within an inner diameter of the bearing; and
wherein the bearing is positioned within an inner diameter of the ferrofluid seal.

11. The gimbal system of claim 10, wherein the stem assembly comprises:
a first stem mounting the bearing and the ferrofluid seal within the base; and
a second stem mounting the motor within the base.

12. The gimbal system of claim 11, wherein at least a portion of the first stem is positioned between the bearing and the motor, and wherein at least a portion of the second stem is positioned within the diameter of the motor.

13. The gimbal system of claim 12, wherein at least a portion of the first stem is positioned between the bearing and the ferrofluid seal.

14. The gimbal system of claim 11, wherein the first stem is formed of a first material and the second stem is formed of a second material different from the first material.

15. The gimbal system of claim 14, wherein the first material is magnetic.

16. The gimbal system of claim 15, wherein the first material is 416 stainless steel, and wherein the second material is 6061-T6 aluminum.

17. The gimbal system of claim 11, further comprising a resolver mounted within the base by the second stem, the resolver positioned within the inner diameter of the bearing.

18. The gimbal system of claim 10, wherein a reference plane is defined orthogonal to the rotational axis, the reference plane intersecting at least portions of the motor and bearing.

19. The gimbal system of claim 14, wherein:
- the first material has a coefficient of thermal expansion to match that of the bearing; and
- the second material has a coefficient of thermal expansion to match that of a motor mount securing the motor to the base.

20. The gimbal system of claim 10, wherein the ferrofluid seal is positioned between the stem assembly and the base.

\* \* \* \* \*